United States Patent [19]
Zald

[11] Patent Number: 4,777,783
[45] Date of Patent: Oct. 18, 1988

[54] METHOD FOR AUTOMATED ACCUMULATION AND LOADING OF PARTS SUCH AS AUTOMOTIVE PARTS AND SYSTEM UTILIZING SAME

[75] Inventor: Roberta L. Zald, Troy, Mich.

[73] Assignee: GMF Robotics Corporation, Auburn Hills, Mich.

[21] Appl. No.: 878,597

[22] Filed: Jun. 26, 1986

[51] Int. Cl.⁴ ............................................. B65B 35/52
[52] U.S. Cl. ....................................... 53/447; 53/247; 53/541; 414/96; 414/331
[58] Field of Search .................. 53/169, 247, 251, 539, 53/541, 447; 414/96, 222, 331

[56] References Cited

U.S. PATENT DOCUMENTS

| | | | |
|---|---|---|---|
| 2,251,197 | 2/1941 | Nestmann | 414/96 X |
| 2,634,001 | 4/1953 | Griffin | 414/96 X |
| 2,924,051 | 2/1960 | More | 53/541 X |
| 3,168,204 | 2/1965 | Voullaire | 53/247 X |
| 3,431,702 | 3/1969 | Spaulding | 53/247 X |
| 3,869,843 | 3/1975 | Darrah | 53/539 X |
| 4,233,802 | 11/1980 | Booth | 53/539 X |

FOREIGN PATENT DOCUMENTS 3231964 3/1984 Fed. Rep. of Germany .
3345929 7/1985 Fed. Rep. of Germany .
3406292 9/1985 Fed. Rep. of Germany .
3406293 9/1985 Fed. Rep. of Germany .

Primary Examiner—John Sipos
Attorney, Agent, or Firm—Brooks & Kushman

[57] ABSTRACT

A method and system are disclosed for the automated accumulation and loading of parts wherein an automated part transfer apparatus is utilized to successively pick up predetermined arrangements of spaced parts from a shuttle at a pair of unloading stations. The part transfer apparatus preferably includes a gantry robot which places the parts in predetermined positions in a container located in the work envelope of the robot. The robot continues to load the parts until the container is full. In the disclosed embodiment, the method and system are utilized for racking automotive parts after they exit a sheet metal processing machine. Preferably, the parts are vertically accumulated in spaced relationship at an accumulator station in which the shuttle aids in the stacking process. A part indexing mechanism also aids in the stacking process at the accumulator station. After the stack of spaced parts is full, the shuttle moves so that a first end of the shuttle containing the spaced parts is located at one of the unloading stations and the opposite, second end of the shuttle moves into the accumulator station. The accumulation process then continues at the second end of the shuttle while the robot is unloading the parts at the first end of the shuttle.

14 Claims, 8 Drawing Sheets

METHOD FOR AUTOMATED ACCUMULATION AND LOADING OF PARTS SUCH AS AUTOMOTIVE PARTS AND SYSTEM UTILIZING SAME

TECHNICAL FIELD

This invention relates to method and apparatus for automated accumulation and loading of parts, such as automotive parts, and, in particular, to method and apparatus for automated accumulation and loading of such parts into a container adapted to receive and retain such parts.

BACKGROUND ART

The predominate approach today to introduce factory automated technology into manufacturing is to selectively apply automation and to create islands of automation. The phrase "islands of automation" has been used to describe the transition from conventional or mechanical manufacturing to the automatic factory. Interestingly, some appear to use the phrase as though it were a worthy end object. On the contrary, the creation of such islands can be a major impediment to achieving an integrated factory.

Manufacturing examples of islands of automation often include numerically controlled machine tools; robots for assembly, inspection, painting, and welding; lasers for cutting, welding and finishing; sensors for test and inspection; automated storage/retrieval systems for storing work-in-process, tooling and supplies; smart carts, monorails, and conveyors for moving material from work station to work station; automated assembly equipment and flexible machining systems. Such islands are often purchased one at a time and justified economically by cost reductions.

To integrate the islands of automation it is necessary to link several machines together as a unit. For example, a machine center with robots for parts loading and unloading can best be tied to visual inspection systems for quality control. Computer numerical control machine tools can all be controlled by a computer that also schedules, dispatches, and collects data. Selecting which islands to link can be most efficiently pursued on the basis of cost, quality and cycle time benefits.

In some cases the islands of automation will be very small (e.g. an individual machine or work station). In other cases the islands might be department-sized.

From a systems viewpoint, islands of automation are not necessarily bad, so long as they are considered to be interim objectives in a phased implementation of an automated system. However, to obtain an integrated factory system, the islands of automation must be tied together or synchronized. Systems synchronization frequently occurs by way of a material-handling system; it physically builds bridges that join together the islands of automation.

Automated material handling has been called the backbone of the automated factory. Other than the computer itself, this function is considered by many automation specialists as the most important element in the entire scenario of automated manufacturing. It is the common link that binds together machines, workcells, and departments into a cohesive whole in the transformation of materials and components into finished products.

To date, the major application for industrial robots has been material handling. Included here are such tasks as machine loading and unloading; palletizing/depalletizing; stacking/unstacking; and general transfer of parts and materials—for example, between machines or between machines and conveyors.

Robots are often an essential ingredient in the implementation of Flexible Manufacturing Systems (FMS) and the automated factory. The automated factory also will include a variety of material transportation devices, ranging from driver-operated forklifts to sophisticated, computer-operated, real-time reporting with car-on-track systems and color graphics tracking. These material transport systems serve to integrate workcells into FMS installations and to tie such installations and other workcells together for total factory material transport control.

With all of their versatility, robots suffer from a limitation imposed by the relatively small size of their work envelope, requiring that part work fixtures and work-in-process be brought to the robot for processing. Complete integration of the robot into the flexible manufacturing system requires that parts and subassemblies be presented to the robot on an automated transport and interface system. For example, installation of a machine tool served by a robot without an automated transport system will result in an inefficient island of automation needing large stores of work-in-process inventory for support, which are necessary to compensate for the inefficiencies of manual and fork truck delivery.

Robots may load and unload workpieces, assemble them on the transport, inspect them in place or simply identify them. The kind of activity at the robot or machine and material transport system interface dictates the transport system design requirements. One of the design variables relating to the interface includes accuracy and repeatability of load positioning (in three planes). Also, care in orienting the workpiece when it is initially loaded onto the transport carrier will save time when the work is presented to the robot or the tool for processing. Proper orientation of the part permits automatic devices to find the part quickly without "looking" for it and wasting time each time it appears at the workstation.

Fixtures may be capable of holding different workpieces, reducing the investment required in tooling when processing more than one product or product style on the same system.

The transport system must be capable of working within the space limitations imposed by building and machinery configurations, yet must be capable of continuous operation with the loads applied by a combination of workpiece weight, fixture weight, and additional forces imposed by other equipment used in the process.

The system must also have the ability to provide queuing of parts at the workstation so that a continuous flow of work is maintained through the process. Automatic queuing of transport carriers should provide gentle accumulation without part or carrier damage.

Robots and the machine tools they serve usually make up a large part of the cost of implementing an automated factory. Part of the justification for the investment is obtained through the ability to increase the operating time of equipment within the plant. With FMS's, the objective is to have machine tools cutting metal for 80% of the time instead of the historic 30%. Therefore, it is important that the materials transport system serving the robots and machine tools be capable of quickly moving into position with parts for loading into the machine, then quickly moving out of the workstation and on to downstream stations. Prompt transporter movements between stations allow work-in-process inventory to be minimized. Batch sizes are smaller and work faster with only a minimum of queuing at each workstation.

Tool changing by robots as an alternative to dedicated, automatic tool changers is becoming attractive owing to flexibility and relative lower cost. A robot equipped with special grippers can handle a large variety of tools, and the tools can be shared quickly by several machines.

For example, a robot which is positioned on a riser may load and unload two identical vertical milling machines with one of many tools. All the tools are stored in a rack in front of the robot between the two milling machines. The parts being machined are brought to the milling machines on auto transfer devices. The entire operation is controlled by a host computer that directs the robot controller and signals it which part type is coming to the robot and which set of tools to select to load and unload into the milling heads.

In designing a transport system, a determination must be made of how the parts are to be presented to the robot and to the workstation, and whether special carrier-top pallet designs are required. It is sometimes possible to move the parts already held in the same fixture that will be utilized by the machine tools during machining. The transport carrier is designed to accommodate chuck-like fixtures which are transferred from the carrier by a robot mounted directly on the machine or turning center. Rapid exchange of parts facilitates the integration of tools and the transport system into a smoothly functioning FMS.

A link for tying together some of the independently automated manufacturing operations is the automatic guided vehicle system (AGVS). The AGVS is a relatively fast and reliable method for transporting materials, parts or equipment. Guide path flexibility and independent, distributed control make an AGVS an efficient means of horizontal transportation. As an alternative to traditional conveying methods, the AGVS provides manufacturing management with a centralized control capability over material movement. Information available from the AGVS also provides management with a production monitoring data base.

Robot installations for transporter interface can be grouped into three principal categories: (1) stationary robots, (2) moving robots (on the floor or overhead), and (3) robots integral with a machine. The moving robots subdivide into two types. First are stationary robots, mounted on a transporter to move between work positions to perform welding, inspection, and other tasks. The second type of moving robot is the gantry unit that can position workpieces weighing more than one ton above the workcells and transport system. The system only has to deliver and pick up somewhere under the span of gantry movement.

A gantry robot can be described as an overhead-mounted, rectilinear robot with a minimum of three degrees of freedom (DF) and normally not exceeding six DF. The robot is controlled by a multi-microprocessor controller allowing it to interact with a multitude of other devices.

Large work envelopes, heavy payloads, mobility, overhead mounting, and the capability and flexibility to do the work of several pedestal-mounted robots are some of the advantages of implementing a gantry robot versus a floor or pedestal-mounted robot.

Gantry robots have been around for many years in various forms, from refueling systems in the nuclear reactor cell to large material-handling systems in the mining industry. There are also pseudogantry robots which are composed of primarily a pedestal robot mounted in the inverted position and on slides, allowing it to traverse over the work area. Since gantry robots are somewhat unique, some terms are used that do not pertain to pedestal robots, as follows:

Superstructure: Also called the gantry support structure or box frame. This is the structure upon which the robot will be elevated from the floor. It is an integral and essential portion of a gantry robot system.

Runway: The longitudinal X axis of the gantry robot. It is normally the passive side rails of the superstructure.

Bridge: The transverse or Y axis of the gantry robot. The bridge is an active member of the robot riding on the runway rails and supporting the carriage.

Carriage: The support structure for the Z axis. Provides the Y axis motion on the bridge.

Telescoping tubes/masts: Depending on the robot this is the vertical or Z axis of the gantry robot. In the case of telescoping tubes, they come together, allowing for a lower ceiling. A sliding mast slides along its length up and down, requiring a ceiling height equal to its stroke above the superstructure.

There are two major designs of gantry-style robots, the four-poster and the cantilever. The four-poster gantry has a complete overhead structure which covers the entire work envelope. The robot is mounted much the same as an underslung bridge crane. The axes consist of an X, Y, and direct vertical Z in Cartesian coordinates with optional wrists that enable straightforward programming and control.

Some of the advantages of the four-poster gantry are: (1) the design can be very modular, allowing for a wide range of sizes in both the X and Y axes; (2) design modularity of supports can allow for heavy payloads; (3) a large work envelope can be provided at a very reasonable cost; and (4) the Cartesian coordinates allow for application of a variety of proven software schemes, including CNC-type controls.

The alternative gantry style is the cantilever type. The basic advantages of this type of robot include: (1) modularity of the X axis, allowing for very long travel; (2) the ability to apply a rotary wrist, making both sides of the gantry available as separate work spaces; (3) a programmable structure overhead, allowing clearance to load and unload parts from above using a crane or forklift, for example; (4) open accessibility from all directions, allowing conveyors, pallets, or part feeding from any direction; (5) design rigidity, permitting extreme accuracy and reliability for light machining tasks or routing applications; and (6) cartesian coordinates and rigid design combination, providing for application of a CNC-type controller with the inherent accuracy to permit off-line programming.

The gantry can be linked to advanced computer control because it offers simplicity of movement and high accuracy. With the system's off-line programming capability, a marriage can be made with CNC machine tools for automatic reprogramming, making small-batch automation economically feasible.

The cantilevered gantry can be used with direct numerical or hierarchical control. It can be coupled with communication and supervisory computers in FMS or complete factory automation systems. The gantry robot can also be fitted with vision and adaptive or advanced sensory interfaces to provide real-time path modifications.

Today's gantry robots have the capability of handling very heavy payloads. Heavier payloads sometimes require stronger end effectors. End effectors for gantry robots sometimes can become very complex, since they can perform more than one task. These end effectors can become very heavy, thereby reducing the effective payload.

End effectors used in material handling such as palletizing include all of the conventional styles—standard grippers, vacuum cups, electromagnets—and many special designs to accommodate unusual application requirements. Dual-purpose tooling is often used to pick up separators or trays, as well as the parts being moved through the system.

Vacuum-type grippers and electromagnetic grippers are advantageous, because they permit part acquisition from above rather than from the side. This avoids the clearance and spacing considerations that are often involved when using mechanical grippers.

However, the use of vacuum and electromagnetic grippers is not without its problems since cycle time is not just a function of robot speed and its accelerating-/decelerating characteristics. Cycle time is dependent on how fast the robot can move without losing control of the load. Horizontal shear forces must be considered in the application of these grippers. This often means that the robot is run at something less than its top speed.

DISCLOSURE OF THE INVENTION

An object of the present invention is to provide an improved method and apparatus for the automated accumulation and loading of parts, such as automotive parts, in an environment which results in the production of high quality products.

Another object of the present invention is to provide an improved method and system for the automated accumulation and loading of parts, such as automotive parts, wherein the parts flow in a planned and orderly fashion while, at the same time, reducing the probability of part damage.

Yet still another object of the present invention is to provide an improved method and system for automated accumulation and loading of parts, such as automotive parts, wherein factory floor space can be utilized effectively while at the same time integrating with preexisting "islands of automation".

In carrying out the above objects and other objects of the present invention, a method is provided for the automated loading of parts into a container adapted to receive and retain the parts therein, the container being located in the work envelope of an automatic part transfer apparatus. A predetermined number of parts are first accumulated in a predetermined spaced arrangement at an accumulator station. All of the accumulated parts are then shuttled from the accumulator station to one of a pair of unloading stations in the work envelope. The apparatus is controlled so that the apparatus picks up the parts from the one unloading station and places the parts in predetermined positions in the container. The predetermined spaced arrangement of parts is maintained during the steps of shuttling and controlling. The above steps are repeated until the container is substantially full.

Further in carrying out the above objects and other objects of the present invention, a system for loading parts into the container is provided. The system comprises an automated part transfer apparatus adapted to receive and retain at least two of the parts in a predetermined spaced arrangement and capable of working within a work envelope. The system further comprises accumulating means for accumulating the parts in the predetermined spaced arrangement at an accumulator station. The accumulating means includes shuttle means for receiving and retaining the parts in the predetermined spaced arrangement. A shuttle drive means is provided for driving the shuttle means so that the shuttle means moves the parts from the accumulator station to one of a pair of unloading stations in the work envelope. A controller controls the part transfer apparatus so that the apparatus picks up the parts from the unloading station and places the parts in predetermined positions in the container, the container being positioned within the work envelope.

Preferably the part transfer apparatus includes a robot which successively picks up the parts from the unloading stations and places the parts into the container without disturbing the predetermined spaced arrangement.

Also, preferably, the parts may be successively accumulated in stacks at opposite ends of the shuttle means to minimize the time required to fully load the container with parts. In this way, while some parts are accumulated at the accumulator station, other parts are being loaded into the container.

In the preferred embodiment, the robot comprises a gantry robot having a specially designed end effector connected to the distal end of its robot arm.

The advantages accruing to the use of such a method and system are numerous. For example, parts can be quickly moved and loaded into a part container without having to store the parts. In this way inventory levels can be kept small. Also, the frequency of part movement is minimized and the parts are kept apart during the process thereby rendering it less likely that the parts to be loaded will be damaged.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
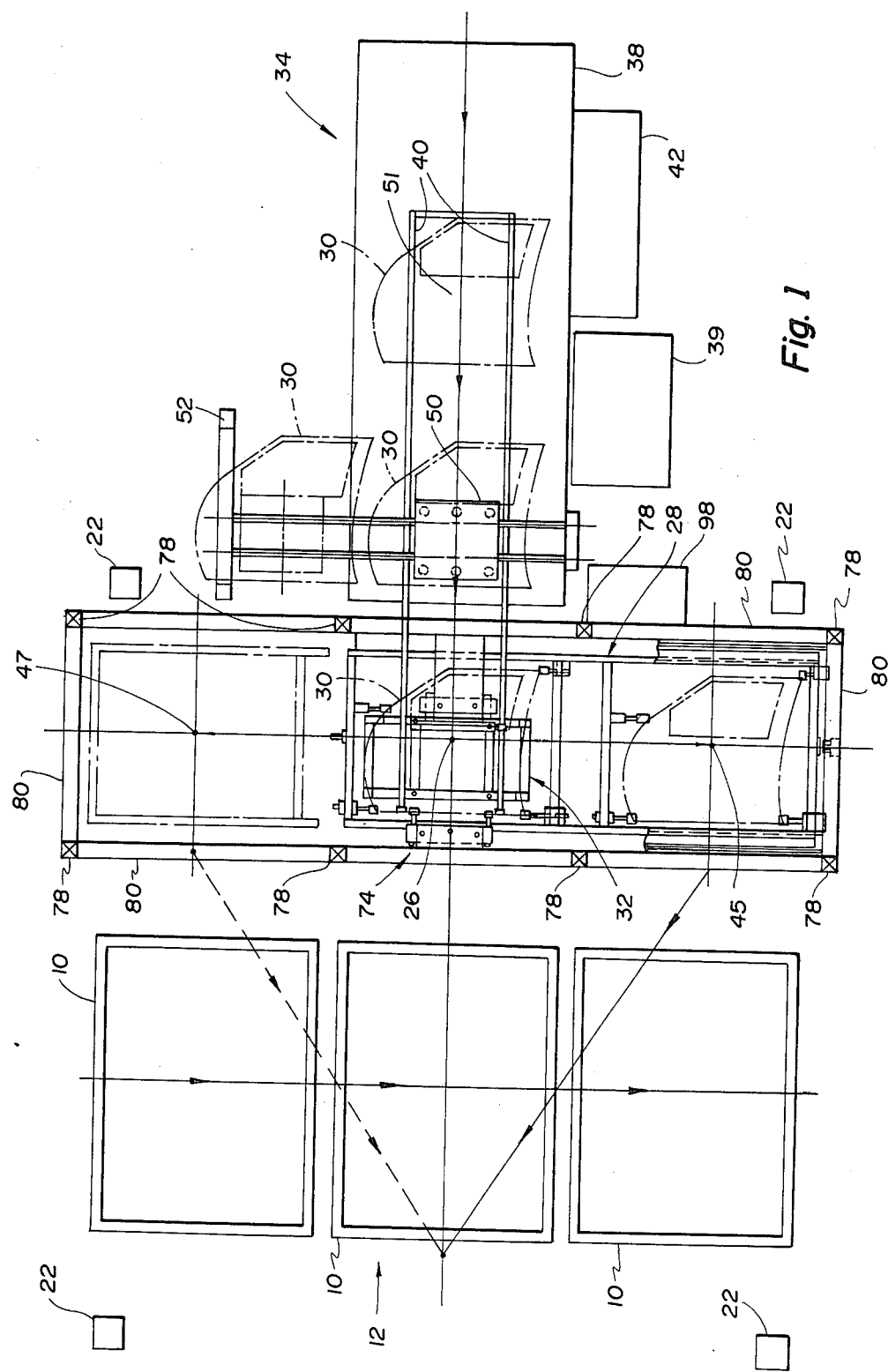
FIG. 1 is a top plan, partially schematic view, partially broken away, illustrating the method and system in accordance with the present invention for the automated accumulation and loading of parts, such as automotive parts, which are illustrated in phantom.
Figure 2:
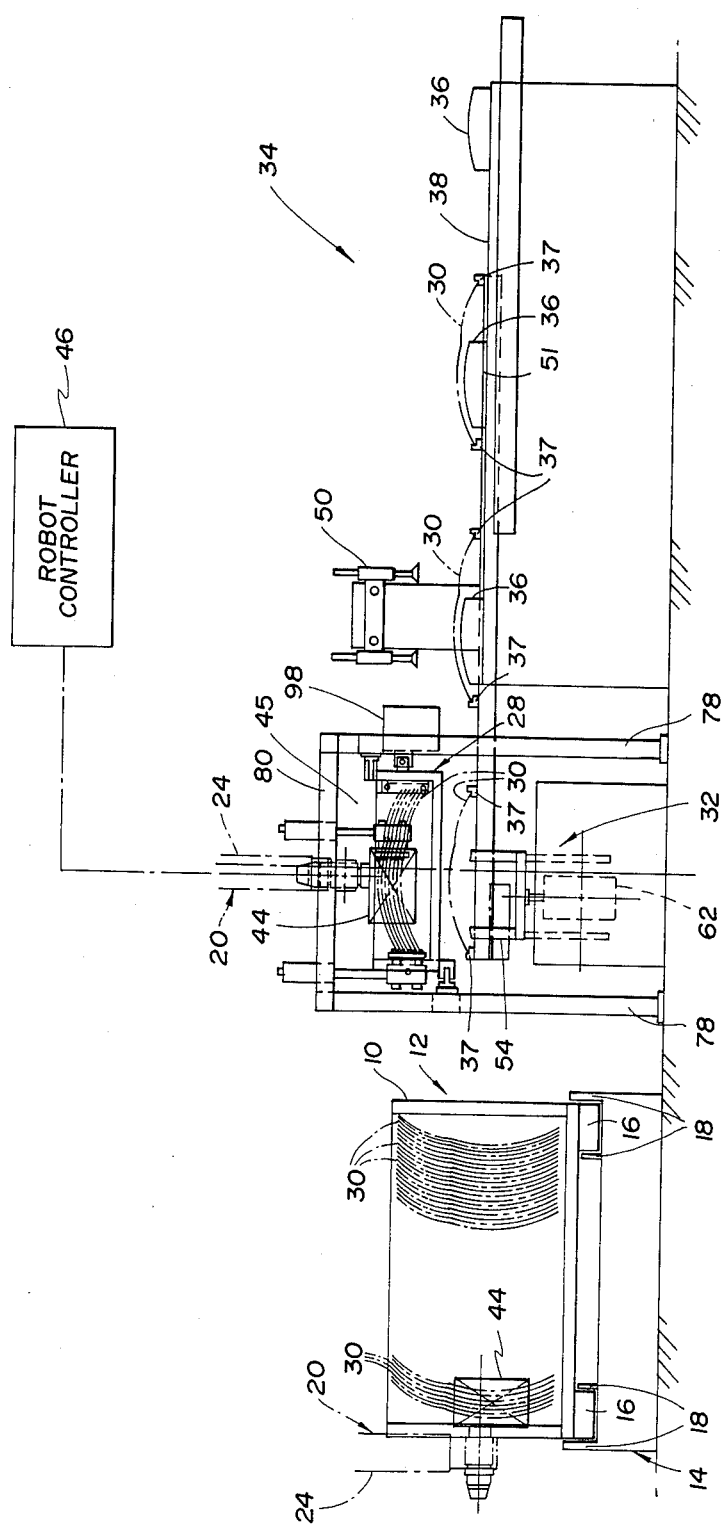
FIG. 2 is a side elevational, partially schematic view, partially broken away, of the system including a robot illustrated in two operative positions in phantom.

Referring to the drawings, there is illustrated in FIGS. 1 and 2, a method and system for automated accumulation and loading of material, such as automotive parts, in containers 10. Such parts may include sheet metal parts such as roof panels, outer lids, panel compartments, outer lift windows, hatchbacks and the like which have been stamped by a sheet metal press or stamping machine. The method and system have particular utility in racking such automotive parts in specially designed baskets or the containers 10.

The containers 10 are indexed to a part loading station 12. Many different methods and apparatus can be utilized to move or index the containers 10 to the part loading station 12, such as by conveyor or monorail, or even manually, without departing from the spirit of the present invention.

As best shown in FIG. 2, a conveyor, generally indicated at 14, receives and retains the containers 10 as they move thereon by means of locating on support rollers 16 which are rotatably supported between pairs of upwardly extending supports 18. The rollers 16 are provided to permit conveyance of the containers 10 within the part loading station 12. The rollers 16 are driven by drive motors (not shown) to move the containers 10. The containers 10 may be located by locating pins (not shown) or any other locating device at any of the particular locations within the part loading station 12, so that the containers 10 do not strike one another.

At the station 12, the containers 10 are located within the work envelope of a gantry robot, generally indicated at 20. The gantry robot 20 is supported by a superstructure, the vertical beams of which are indicated at 22 in FIG. 1. The gantry robot 20 includes a carriage (not shown) which is slidably mounted within its runway defined by horizontal beams (also not shown). The gantry robot 20 also includes a telescoping tube or mast 24 which comprise the vertical or Z axis of the robot 20. An end effector, generally indicated at 43 in FIG. 9, includes a gripper 44 mounted on a wrist 45' of the robot 20.

In general, at an accumulator station 26, one end portion of a tray shuttle mechanism, generally indicated at 28, is filled with automotive parts 30. The opposite end portion of the shuttle mechanism is located in one of a pair of unloading stations 45 and 47. The parts 30 are moved into the station 26 by being lifted up by a part lift mechanism, generally indicated at 32, from a conveying means or mechanism, generally indicated at 34 in FIGS. 1 and 2. The conveying mechanism 34 preferably comprises a plurality of part support fixtures or transfer beds 36 which include support fixtures 37. The beds 36 are connected in spaced relationship to an indexing conveyor or transfer rail 38. The transfer rail 38 is driven by a transfer drive 39. The upper surface of each of the support fixtures 37 is preferably formed to be complementary with the lower surface of each part 30 so that each part 30 is not only positioned properly, but also has a proper orientation for transfer to the part lift mechanism 32 by transfer bars 40 shown in a pair of positions by phantom lines in FIG. 3. The bars 40 are moved vertically by a lift drive 42. In this way, the parts 30 are transferred through a combination of indexing horizontal and vertical steps, as is well known in the art.

The system also preferably includes a reject-part removal mechanism 50, as shown in FIG. 2, which removes defective parts 30 which have been inspected at an inspection station 51 upstream the mechanism 50. The mechanism 50 places the rejected part onto another conveyor 52 parallel to the transfer rail 38.

Figure 3:
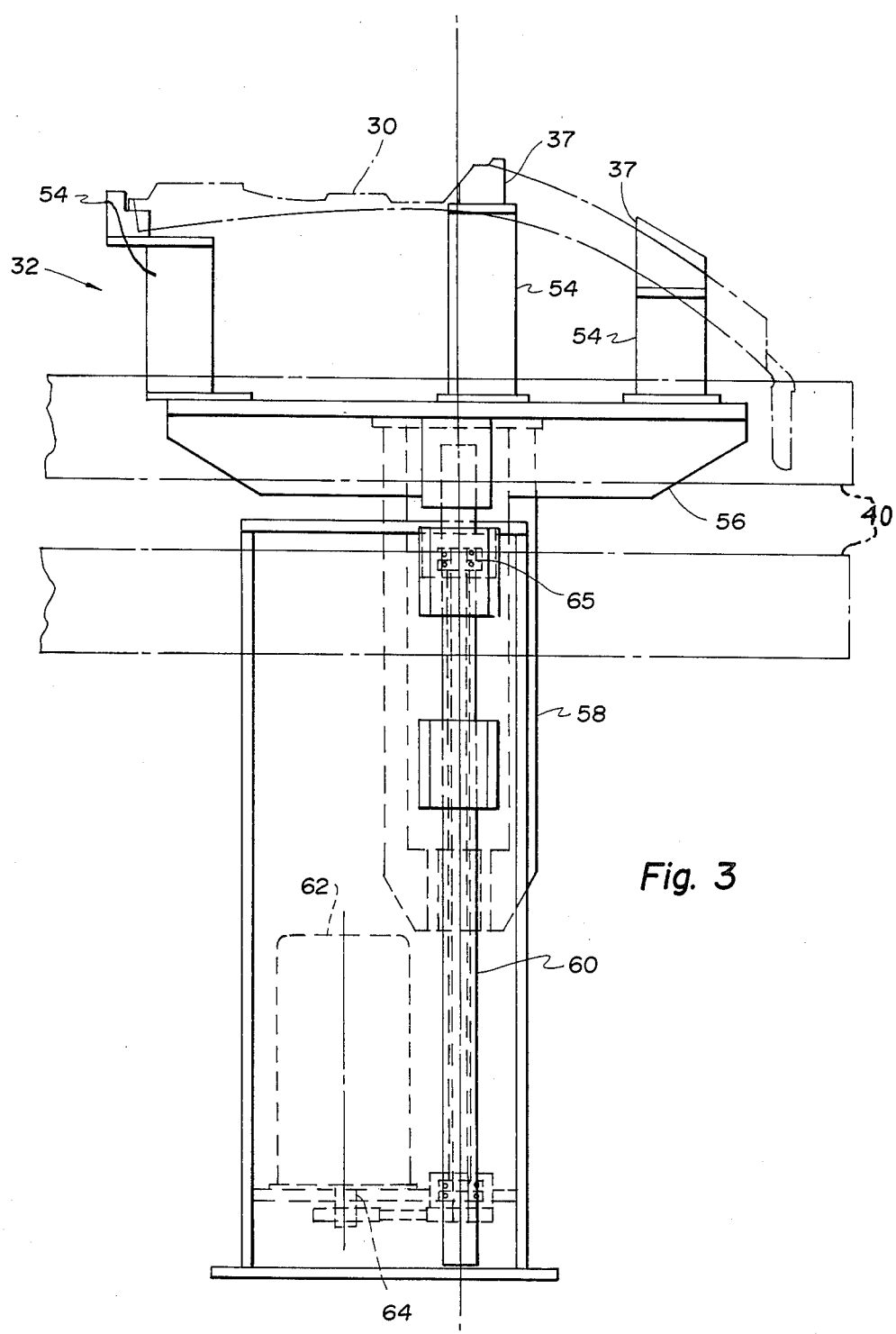
FIG. 3 is a side elevational detailed view, partially broken away, of a part lift mechanism of the system with a part to be lifted indicated in phantom.

Referring to FIG. 3, the part lift mechanism 32 includes a plurality of spaced apart support members 54 which are mounted on a support stand 56. In turn, the support stand 56 is supported for vertical movement on a nut mechanism 58 which is threadedly mounted on a screw 60 for vertical movement upon rotation of the screw 60. In turn, the screw 60 is rotatably coupled to a stepper motor 62 having an output shaft 64. The opposite end of the screw 60 is rotatably mounted by a bearing 65. Upon rotation of the output shaft 64 the screw 60 will turn, thereby causing the nut mechanism 58 to move either upwardly or downwardly thereby causing the supported part 30 to follow this movement.

The shuttle mechanism 28 is movably supported on a bridge structure, generally indicated at 76, which includes a plurality of interconnecting vertical and horizontal beams and plates 78 and 80, respectively. The shuttle mechanism 28 also includes a plurality of interconnecting vertical and horizontal beams and plates 65 and 67 to support the other parts of the shuttle mechanism 28. Since the two end portions of the shuttle mechanism 28 are substantially identical only one end portion will be described in detail.

After the part lift mechanism 32 lifts a part 30 into the accumulator station 36, a first set of lowermost fingers 66, mounted on the shuttle mechanism 28, receive and retain the part 30 by moving inwardly from a retracted position. The first set of fingers 66 are removably mounted on the ends of shafts 68 which, in turn, are controlled to move between extended and retracted positions by cylinders 70 mounted on the shuttle mechanism 28. The fingers 66 may be replaced by fingers having a different configuration if the system is to accumulate parts having a different configuration.

Figure 4:
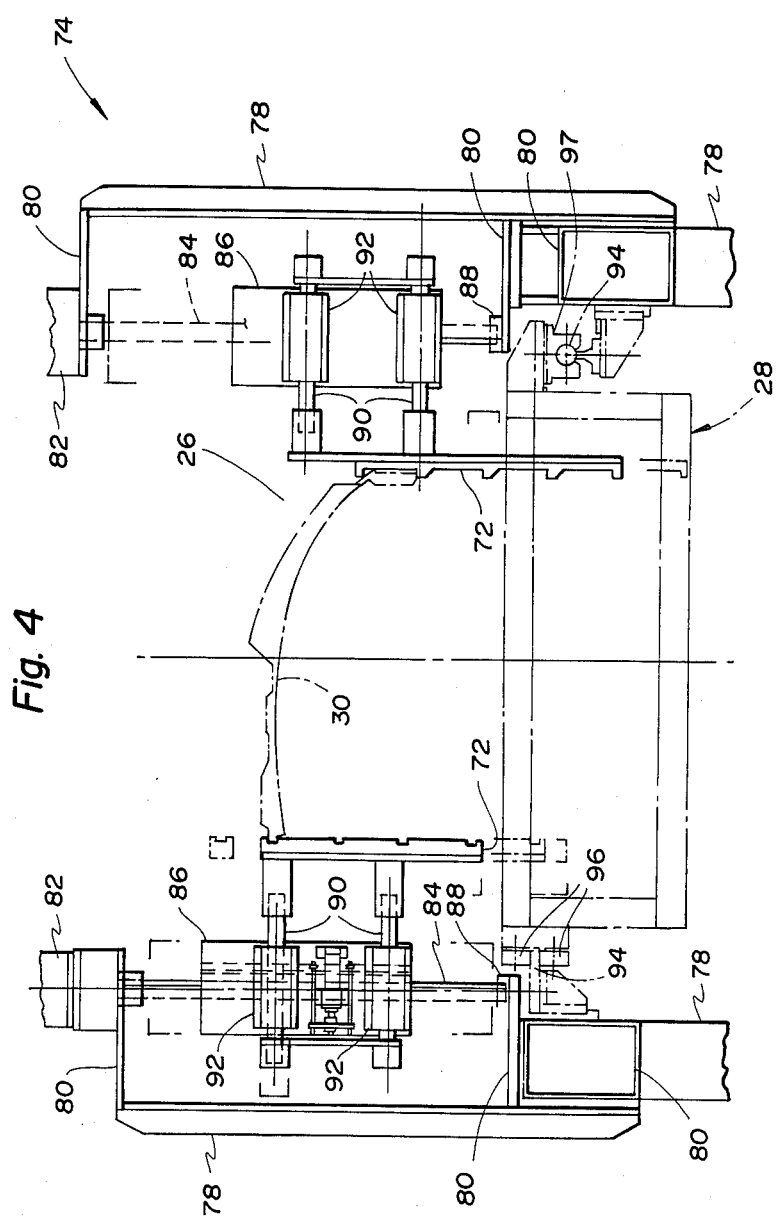
FIG. 4 is a side elevational view, partially broken away, of a part load mechanism of the system.
Figure 5:
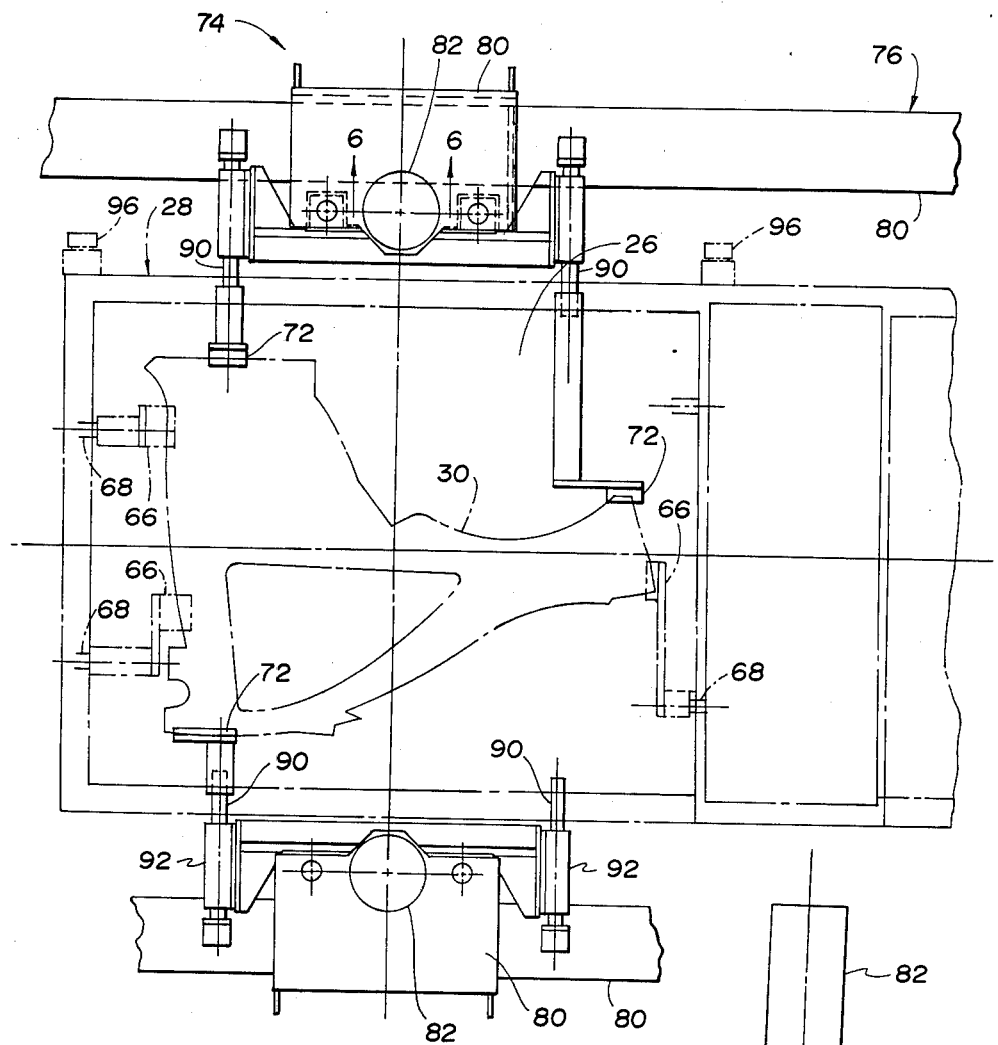
FIG. 5 is a top plan view, partially broken away, of the part load mechanism of FIG. 4.
Figure 6:
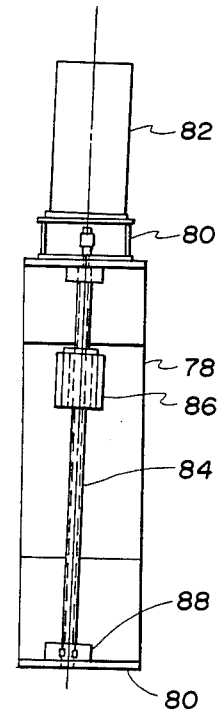
FIG. 6 is a sectional view of a drive for the part load mechanism taken along lines 6—6 of FIG. 5.
Figure 7:
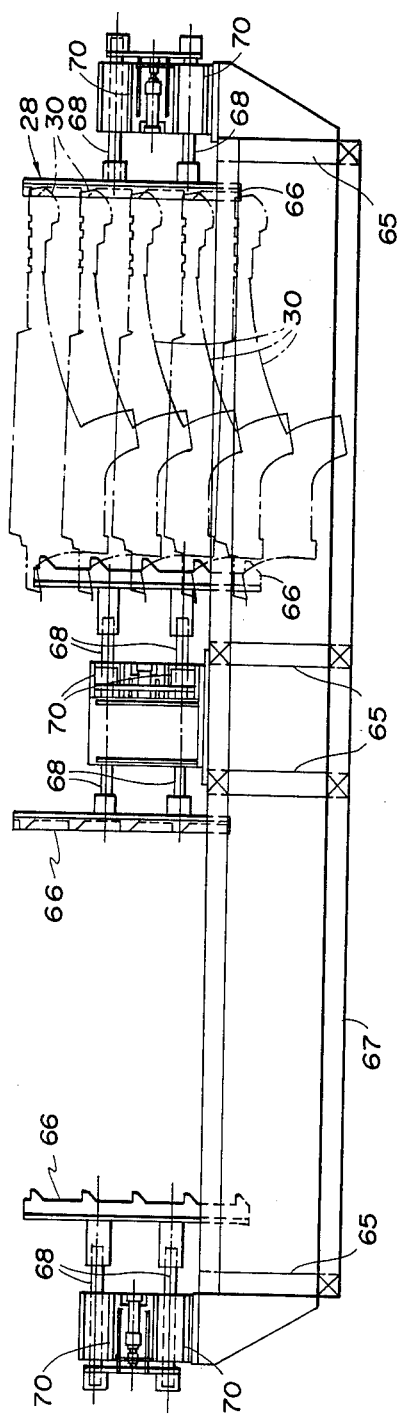
FIG. 7 is a side elevational view of a shuttle mechanism of the system.
Figure 8:
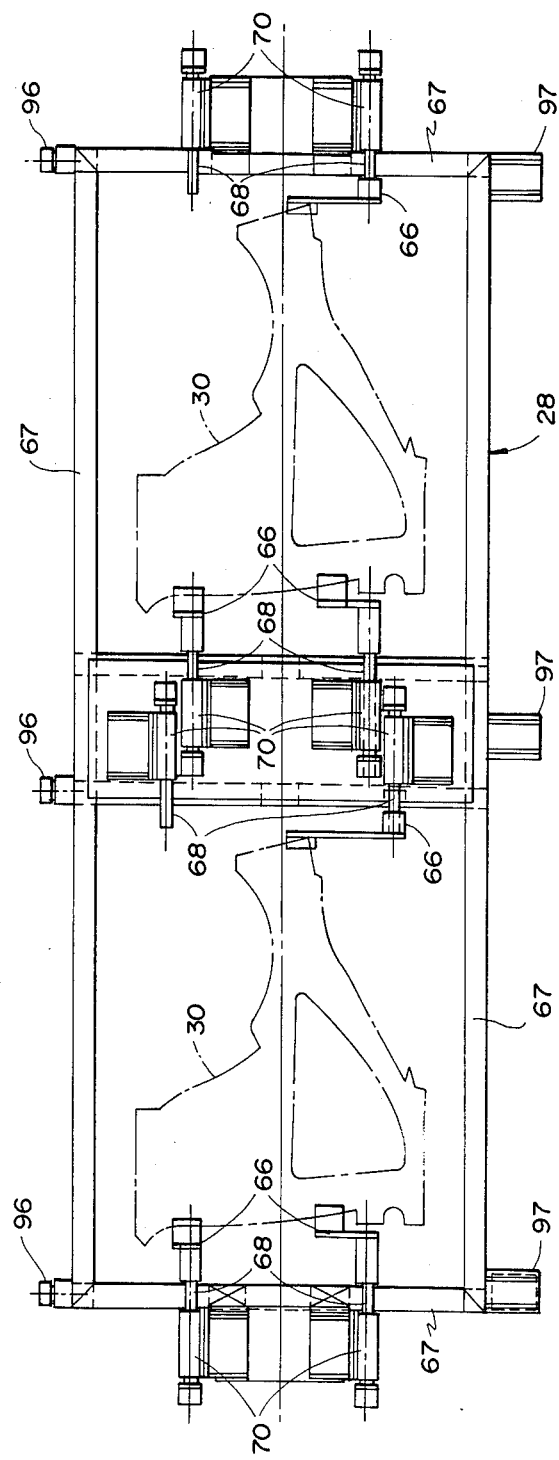
FIG. 8 is a top plan view of the shuttle mechanism.

Referring to FIGS. 4 and 5, a part loading mechanism, generally indicated at 74, includes a second set of movable fingers 72 which receive and retain the stack of parts 30 when the first set of fingers 66 are retracted. The parts 30 are moved upwardly by the second set of fingers 72 which are vertically driven by a pair of stepper motors 82 mounted on opposite sides of the bridge structure 76. The output shaft of each of the stepper motors 82 is mechanically coupled to a screw 84 on which a nut structure 86 is mounted for vertical movement upon rotation of the screw 84. The fingers 72 are supported on the nut structures 86. The opposite end of each of the screws 84 is rotatably mounted by a bearing 88 at the top surface of one of the horizontally extending plates 80.

Referring to FIG. 4, the second set of fingers 72 are also removable to accommodate different parts. The fingers 72 are mounted on the ends of shafts 90 of cylinders 92 which, in turn, are supported on their respective nut structures 86. The shafts 90 and, consequently, their respective fingers 72, are controlled to move between extended and retracted positions by their respective cylinders 92. The fingers 72 are movable upwardly or downwardly according to the direction of movement of the nut structures 86 along their respective screws 84.

After the parts 30 within the shuttle mechanism 28 have been moved vertically upward by the part load mechanism 74, the first set of fingers 66 mounted on the shuttle mechanism 28 are again moved inwardly to receive and retain the parts 30 in the tray shuttle mechanism 28. Then the second set of fingers 72 mounted on the part loader mechanism 74 are moved outwardly or retracted.

When the shuttle mechanism 28 is full of parts, the shuttle mechanism 28 is shuttled so that the stack of parts 30 are positioned in one of the pair of unloading stations 45 and 47. As illustrated in FIG. 4 by phantom lines, the shuttle mechanism 28 is slidably mounted on a pair of spaced, parallel shuttle rails 94 of the bridge structure 76. The length of the shuttle mechanism 28 and the length of the bridge structure 76 is such that the length of the shuttle stroke is held constant and is equal to the distance between the accumulator station 26 and either one of the unloading stations 47 and 45.

The shuttle mechanism 28 includes a plurality of rollers 96 and slides 97 which respectively rollingly and slidably engage the shuttle rails 94 to permit shuttle movement of the shuttle mechanism 28. A shuttle drive, indicated at 98 in FIGS. 1 and 2, drives the shuttle mechanism 28.

Figure 9:
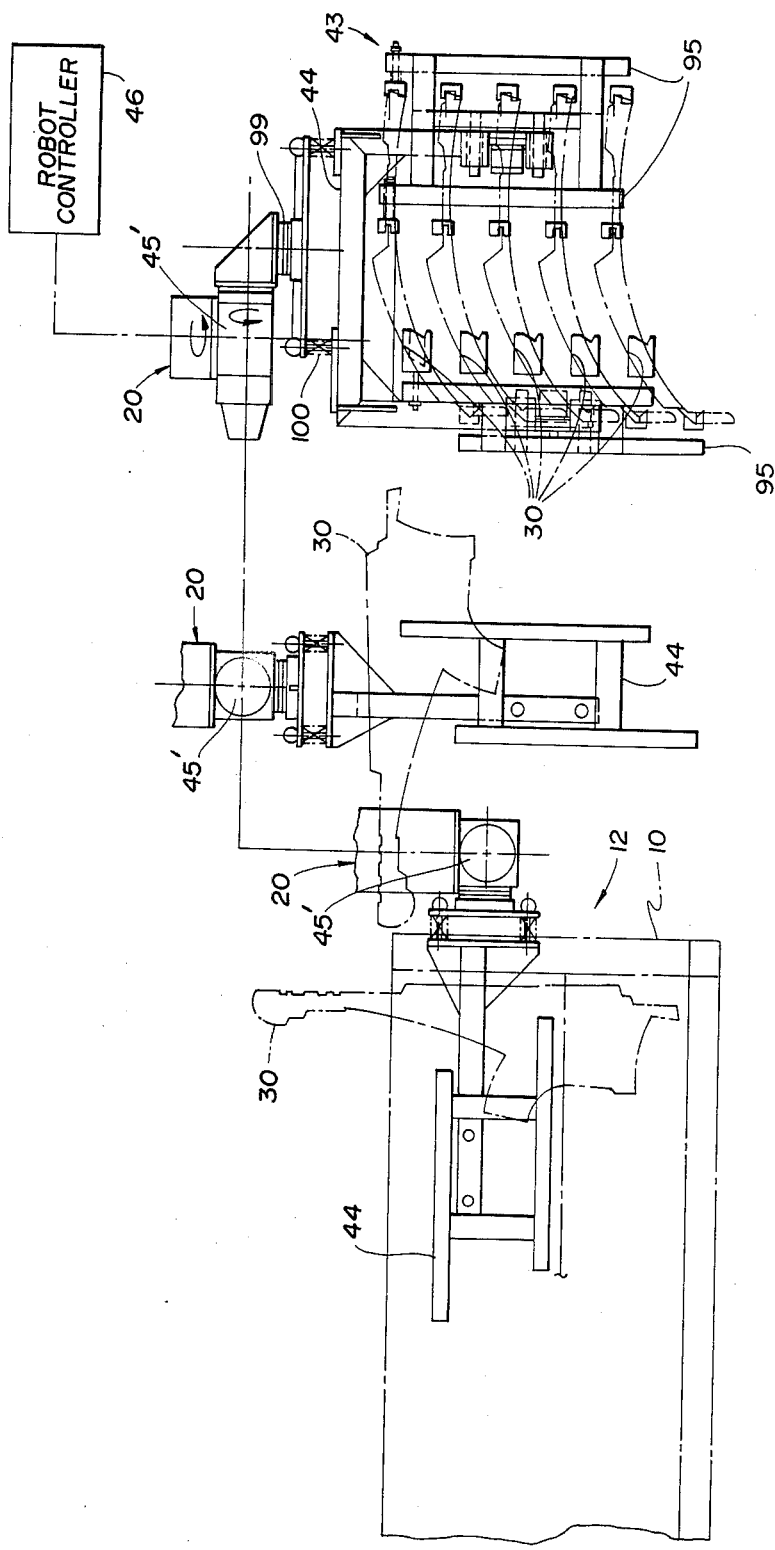
FIG. 9 is a side elevational view, partially broken away, of a portion of the system illustrating the different loading movements of a gantry robot of the system.

Referring to FIG. 9, there is illustrated some of the various movements taken by the gantry robot 20 and its associated gripper 44 in picking up a stack of parts 30 from one of the unloading stations 47 and 45 and placing the parts 30 in the container 10. The gripper 44 preferably includes a plurality of extensible and retractable, spaced fingers 95 complimentarily shaped to the shape of the parts 30 to maintain the spacing between the parts 30 during the movements illustrated in FIG. 9. Also, quick change tooling 99 and a compliance mechanism 100 are interposed between the robot wrist 45' and the gripper 44. The tooling 99 allows a different gripper to be used when handling parts of a different configuration. The compliance mechanism 100 adjusts for small misalignments, as is well known in the art.

Initially, after the gripper 44 has been positioned above the parts 30 to be picked up at the first unloading station 45, the robot 20 is controlled in a conventional fashion by its robot controller 46 to move downwardly along its Z axis to a position immediately adjacent the parts 30. Then the robot 20 is controlled so that the fingers 95 of the gripper 44 are extended to receive and retain the parts 30. The gripper 44 then lifts the parts 30 from the shuttle mechanism 28. The robot 20 and its gripper 44 are controlled to rotate the parts 30 90° about a pair of axes of the wrist 45' while moving the parts 30 longitudinally towards the container 10 and through a loading downstroke. The parts 30 are then released by the fingers 95 of the gripper 44 by retracting the fingers 95. The fingers 95 are retracted as well as extended by cylinders (not shown).

The robot 20 then reverses its prior movements to move to a position above a second set of parts 30 at the second unloading station 47 into which the opposite end of the shuttle mechanism 28 has moved after accumulating a second set of parts 30.

After the containers 10 are fully loaded by the gantry robot 20, the containers 10 are moved out of the loading station 12 and, consequently, out of the work envelope of the robot 20.

A control means or a programmed host computer is preferably electrically coupled to the robot controller 46 and the other part and container handling mechanisms in order to synchronize motion of the containers 10, the parts 60 and the robot 20.

The invention has been described in an illustrative manner and, it is to be understood that, the terminology which has been used is intended to be in the nature of words of description rather than of limitation.

Many modifications and variations of the present invention are possible in light of the above teachings. It is, therefore, to be understood that, within the scope of the appended claims, the invention may be practiced otherwise than as specifically described.

What is claimed is:

1. A method for the loading of shaped parts into a stacking container adapted to receive and retain the parts therein, the method utilizing a program controlled robot having an end effector movable with respect to at least two control axes, the method comprising the steps of:
   (a) stacking a predetermined number of parts in a predetermined spaced, non-contact stack at an accumulator station;
   (b) shuttling the stacked parts from the accumulator station to at least one unloading station;
   (c) moving the end effector with respect to the two control axes to pick up the stack of parts from the at least one unloading station and place the stack of parts in predetermined positions in the container;
   (d) maintaining the predetermined spaced, non-contact stack of parts during the steps of shuttling and moving;
   (e) conveying the parts from an upstream position to a downstream position adjacent the accumulator station;
   (f) loading the parts from the downstream position to the accumulator station; and
   (g) iterating steps (a) through (f) until the container is substantially full.

2. The method of claim 1 wherein steps (a) and (c) are performed substantially simultaneously on different sets of parts.

3. The method of claim 1 further comprising the steps of:
   (f) conveying the parts from an upstream position to a downstream position adjacent the accumulator station; and
   (g) vertically moving the parts from the downstream position to the accumulator station.

4. The method of claim 3 wherein steps (f) and (c) are performed substantially simultaneously.

5. The method of claim 1 wherein said step of accumulating includes the steps of:
   (h) receiving and retaining the parts at the accumulator station; and
   (i) vertically indexing the parts at the accumulator station in preparation for receiving and retaining another part at the accumulator station.

6. The method of claim 5 wherein said steps (i) and (c) are performed substantially simultaneously.

7. The method of claim 1 wherein the end effector is adapted to receive and retain the plurality of parts in the predetermined, spaced, non-contact arrangement.

8. The method of claim 1 wherein a predetermined number of parts are successively shuttled to two unloading stations.

9. A system for loading shaped parts into a stacking container, the system comprising:
   a program controlled robot having an arm provided with an end effector movable with respect to at least two control axes, and adapted to receive and retain at least two of the parts in a predetermined spaced, non-contact arrangement;

accumulator means for accumulating the parts in the predetermined spaced, non-contact stack at an accumulator station, said accumulating means including shuttle means for receiving and retaining said parts in the predetermined spaced, noncontact stack;

shuttle drive means for driving said shuttle means, said shuttle means moving the stack of parts from the accumulator station to at least one unloading station; and a controller for causing the robot to move the end effector with respect to the at least two control axes to successively pick up the stack of parts from the unloading station and place the stack of parts in predetermined positions in the container.

10. The system as claimed in claim 9 wherein said robot comprises a gantry robot.

11. The system as claimed in claim 10 wherein said robot comprises a gantry robot having an arm, said end effector being mounted at the free end of the arm.

12. The system as claimed in claim 9 further comprising conveyor means for conveying the parts from an upstream position to a downstream position adjacent the accumulator station and a part lift mechanism for lifting the parts from the downstream position to the accumulator station, said shuttle means receiving and retaining each part lifted by said mechanism into the accumulator station.

13. The system as claimed in claim 12 wherein said accumulator means includes part indexing means for vertically indexing the accumulated parts at the accumulator station in preparation for said shuttle means receiving and retaining another part.

14. The system as claimed in claim 9 wherein said shuttle means is adapted to receive and retain first and second sets of spaced parts at opposite ends thereof.

* * * * *